United States Patent
Feng

(10) Patent No.: US 6,467,781 B2
(45) Date of Patent: Oct. 22, 2002

(54) TRICYCLE

(75) Inventor: Pin-Chieh Feng, Chang Hua Hsien (TW)

(73) Assignee: Melton International L.L.C., Dover, DE (US)

( * ) Notice: Subject to any disclaimer, the term of this patent is extended or adjusted under 35 U.S.C. 154(b) by 0 days.

(21) Appl. No.: 09/733,091

(22) Filed: Dec. 11, 2000

(65) Prior Publication Data

US 2002/0053775 A1 May 9, 2002

(51) Int. Cl.[7] ................................................. B62M 1/00
(52) U.S. Cl. ............................. 280/87.01; 280/87.041; 280/87.042; 280/11.27; 280/62
(58) Field of Search ........................... 280/11.27, 11.28, 280/62, 87.01, 87.021, 87.041, 87.042

(56) References Cited

U.S. PATENT DOCUMENTS

| | | | | |
|---|---|---|---|---|
| 4,087,106 A | * | 5/1978 | Winchell | 280/220 |
| 4,123,079 A | * | 10/1978 | Biskup | 280/220 |
| 4,540,192 A | * | 9/1985 | Shelton | 280/282 |
| 6,120,044 A | * | 9/2000 | Tsai | 280/87.05 |
| 6,142,493 A | * | 11/2000 | Wang et al. | 280/87.041 |
| 6,179,307 B1 | * | 1/2001 | Mao | 280/87.041 |
| 6,206,388 B1 | * | 3/2001 | Oubuter | 280/87.042 |
| 6,220,612 B1 | * | 4/2001 | Beleski, Jr. | 280/87.041 |
| 6,234,501 B1 | * | 5/2001 | Chen | 280/87.041 |
| 6,279,930 B1 | * | 8/2001 | Chang et al. | 280/87.042 |
| 6,276,843 B1 | * | 9/2001 | Lin | 280/11.28 |
| 6,302,415 B1 | * | 10/2001 | Wang et al. | 280/87.041 |

* cited by examiner

Primary Examiner—Avraham Lerner
Assistant Examiner—L. Lum
(74) Attorney, Agent, or Firm—Browdy and Neimark, P.L.L.C.

(57) ABSTRACT

A tricycle comprises a front tube, a handlebar frame, a front fork, a front wheel, two footboards, and a swiveling member. The handlebar frame is put through the front tube. The front fork is fastened with the bottom end of the handlebar frame for fastening the front wheel. The two footboards are pivoted with the front tube and are formed of a bottom tube, a step board, and a rear wheel. The swiveling member is pivoted with the front tube and is provided at the top end the bottom end with a cross rod. The two cross rods are arranged at an interval between the two bottom tubes.

3 Claims, 7 Drawing Sheets

TRICYCLE

FIELD OF THE INVENTION

The present invention relates generally to a human-powered vehicle, and more particularly to a tricycle.

BACKGROUND OF THE INVENTION

The bicycle and the scooter are popular human-powered vehicles for amusement purpose. The scooter is in fact derived from the bicycle. A new comer, which is known as "tricycle", is more or less a hybrid of the bicycle and the scooter. The tricycle is intended for amusement and exercise.

SUMMARY OF THE INVENTION

The primary objective of the present invention is to provide a tricycle which is relatively safer than any other human-powered vehicle available in the market place today.

The tricycle of the present invention comprises a front tube, a handlebar frame, a front fork, a front wheel, two footboards, and a swiveling member. The handlebar frame is formed of an upright portion which is received in the front tube, and a grip portion extending from each of two sides of the top end of the upright portion. The front fork is composed of two side wings extending respectively from two sides of the bottom end of the upright portion. The two side wings are provided at the free end thereof with a shaft connection portion extending therefrom. The front wheel is fastened to the shaft connection portion. The two footboards are disposed on two sides of the front tube and are formed of a bottom tube, a step board, and a rear wheel. The bottom tube is pivoted at the front end thereof to the front tube. The step board is fastened with the rear end of the bottom tube. The rear wheel is fastened to the underside of the step board. The swiveling member is pivoted to the front tube and is provided at the top and the bottom ends with a cross rod. The two cross rods are disposed between the two bottom tubes such that the two cross rods are separated from each other at an interval.

DETAILED DESCRIPTION OF THE INVENTION

Figure 1:
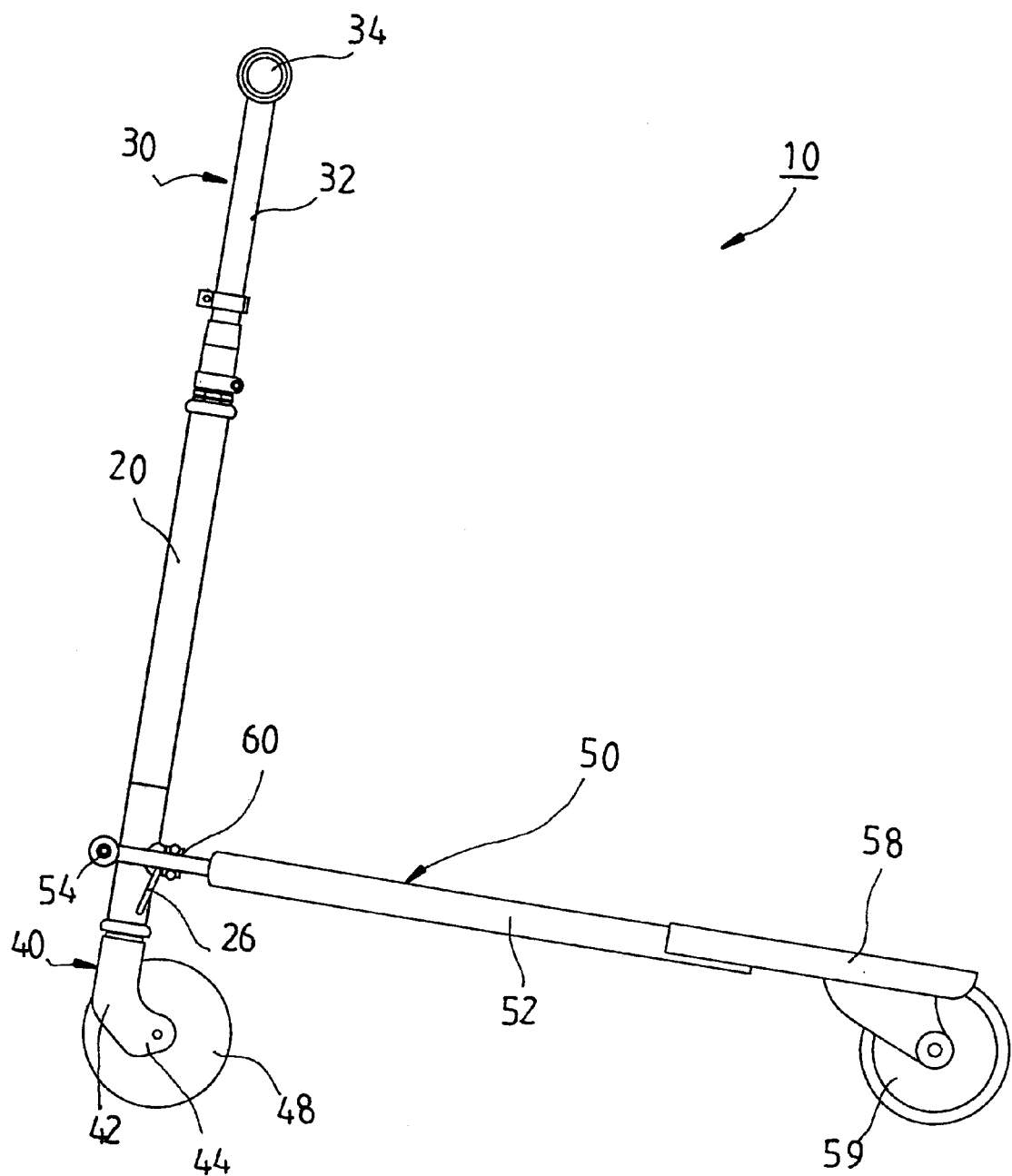
FIG. 1 shows a side view of a preferred embodiment of the present invention.
Figure 2:
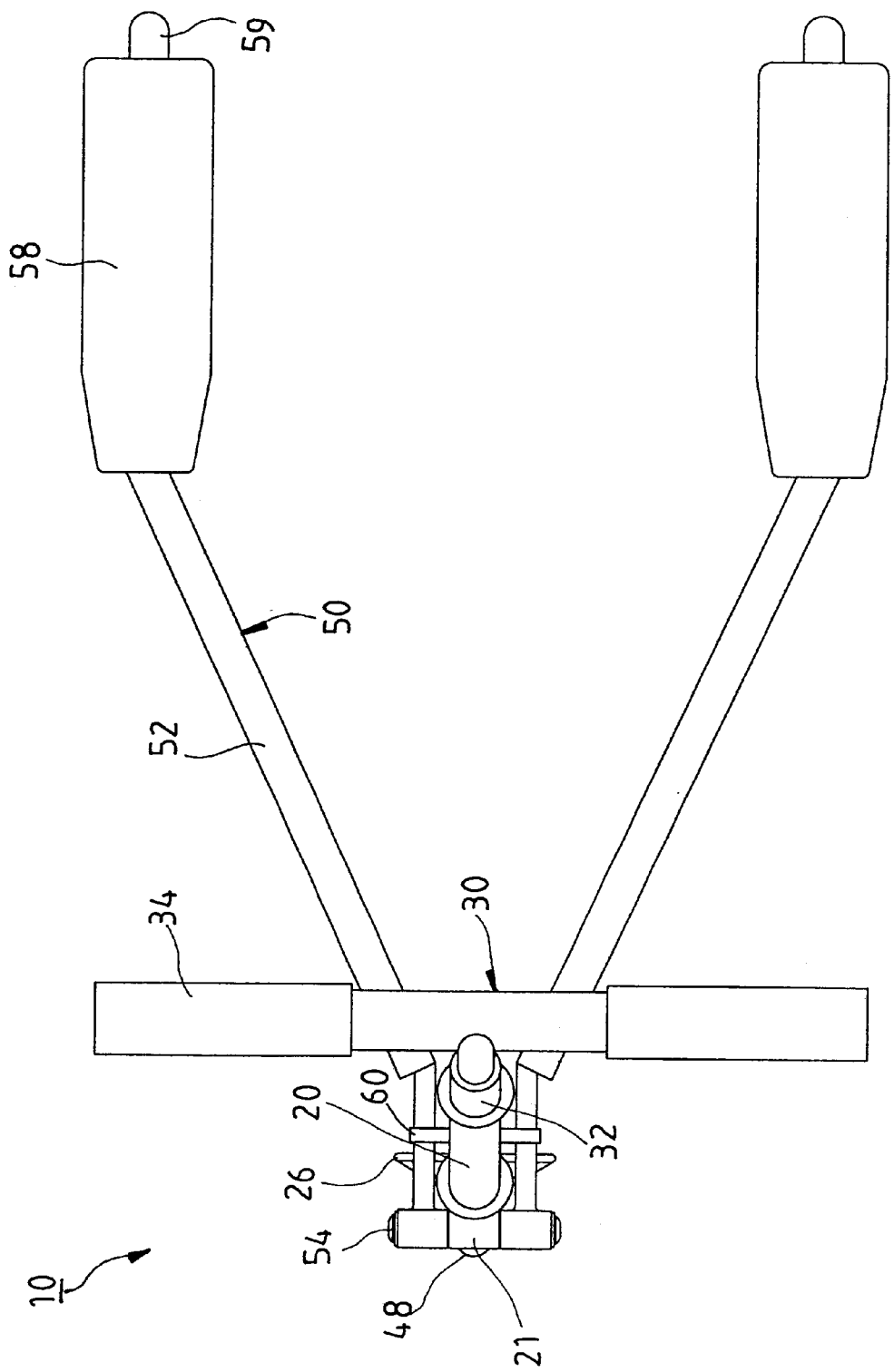
FIG. 2 shows a top view of the preferred embodiment of the present invention.

As shown in FIGS. 1 and 2, a tricycle 10 embodied in the present invention comprises a front tube 20, a handlebar frame 30, a front fork 40, a front wheel 48, two footboards 50, and a swiveling member 60.

The front tube 20 is made of a metal material, such as aluminum alloy and is provided at the front side with a pivoting seat 21 which is in turn provided in the center thereof with a pivoting hole 22 extending horizontally. The front tube 20 is provided at the rear side thereof with a protruded pillar 24 which is in turn provided at the rear end with a threaded hole 25. The front tube 20 is further provided with two urging frames 26, which are located under the protruded pillar 24.

The handlebar frame 30 is formed of an upright portion 32, and a grip portion 34 extending from each of two sides of the top end of the upright portion 32. The upright portion 32 is received in the front tube 20 such that both top end and bottom end of the upright portion 32 project out of the front tube 20.

The front fork 40 comprises two side wings 42 extending from two sides of the bottom end of the upright portion 32 of the handlebar frame 30. The side wings 42 a re provided at the bottom end with a shaft connection portion 44 for fastening the front wheel 48.

Figure 3:
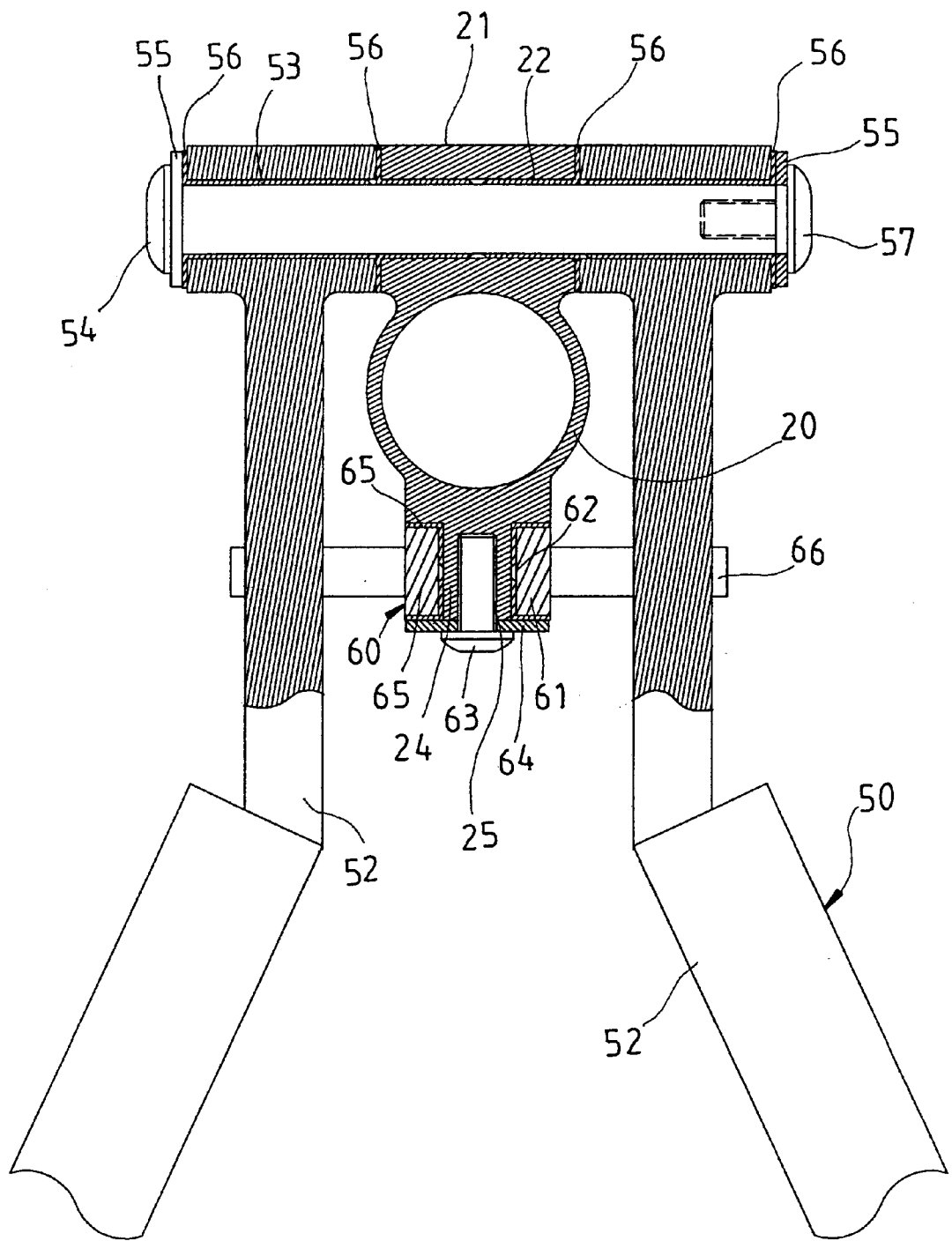
FIG. 3 shows a partial sectional view of the footboard and the swiveling member of the preferred embodiment of the present invention.
Figure 4:
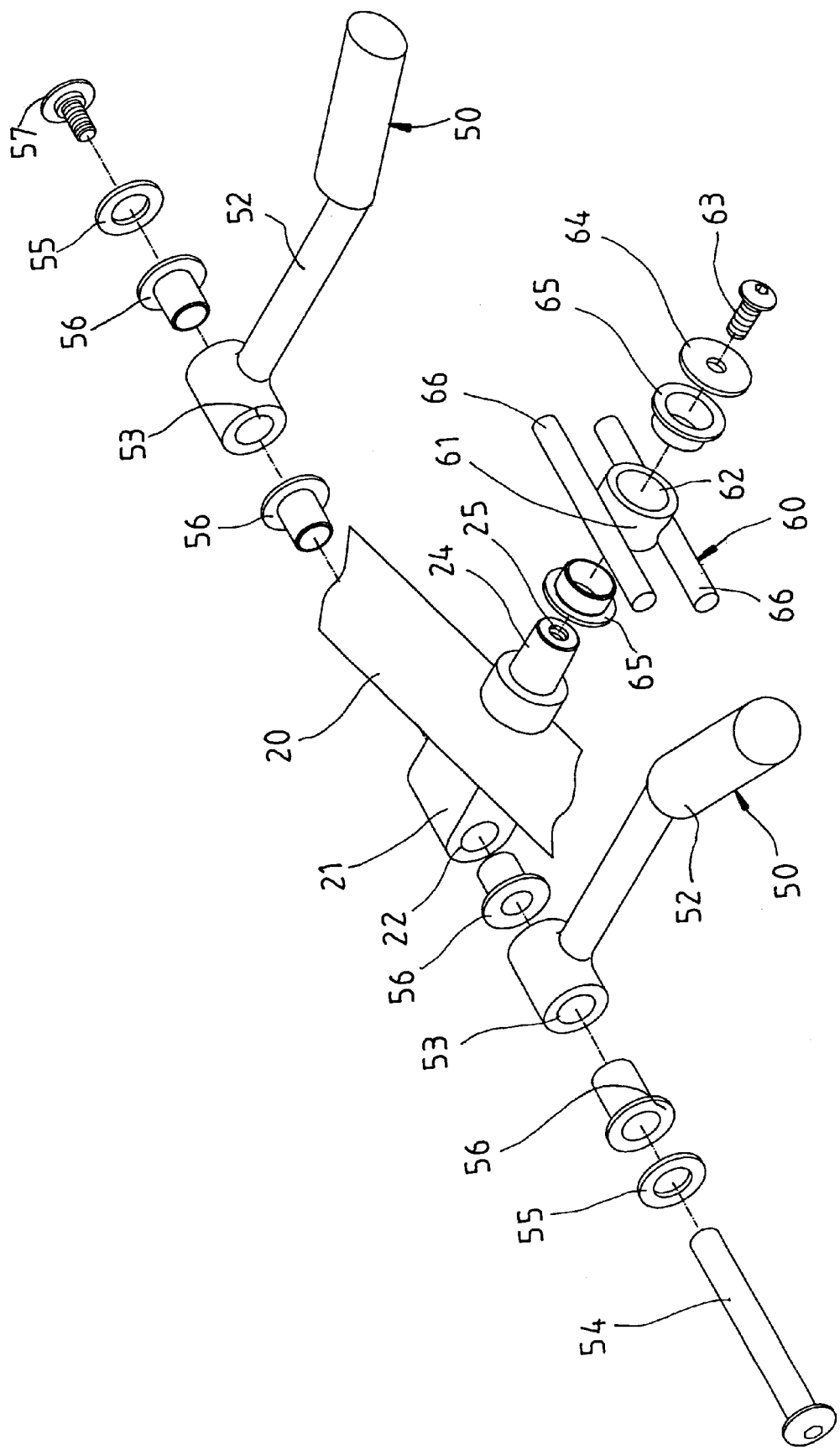
FIG. 4 shows an exploded view of the front tube, the footboard and the swiveling member of the preferred embodiment of the present invention.

The two footboards 50 are disposed at two sides of the front tube 20 and are formed of a bottom tube 52, a step board 58, and a rear wheel 59. The bottom tube 52 is pivoted at the front end to the front tube 20. The step board 58 is fastened to the rear end of the bottom tube 52. The rear wheel 59 is fastened to the under side of the step board 58. As shown in FIGS. 3 and 4, the two bottom tubes 52 are provided at the front end with a pivoting hole 53 extending horizontally and corresponding in location to the pivoting hole 22 of the front tube 20. The two bottom tubes 52 and the front tube 20 are pivoted together by a pivot 54 which is engaged with the pivoting holes 53 and 22. Each element is provided with a plurality of pads 55, plastic sleeves 56 and bolts 57 for securing the front tube 20, the two bottom tubes 52, and the pivot 54. The pivoting range of the two bottom tubes 52 is confined by the two urging frames 26 which are located under the bottom tubes 52.

The swiveling member 60 has a body 61 which is provided with a through hole 62 for receiving the protruded pillar 24 which is in turn provided with a threaded hole 25 for engaging a bolt 63 by which the swiveling member 60 is fastened pivotally with the front tube 20. The swiveling member 60, the protruded pillar 24, and the bolt 63 are provided therebetween with a plurality of pads 64 and plastic sleeves 65 for securing the elements. The body 61 is provided at the top and the bottom ends with a cross rod 66. The cross rods 66 are arranged in a parallel manner between the two bottom tubes 52.

The tricycle may be provided with a brake for controlling the front wheel 48 or rear wheel 59.

Figure 8:
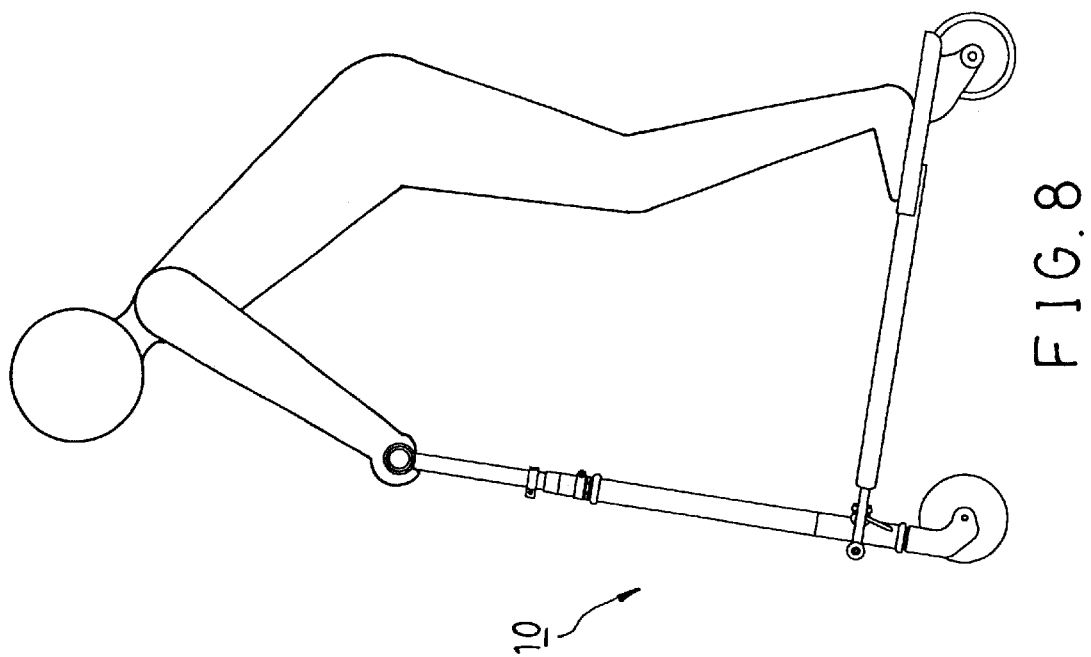
FIG. 8 shows a schematic view of the preferred embodiment of the present invention in operation .
Figure 9:
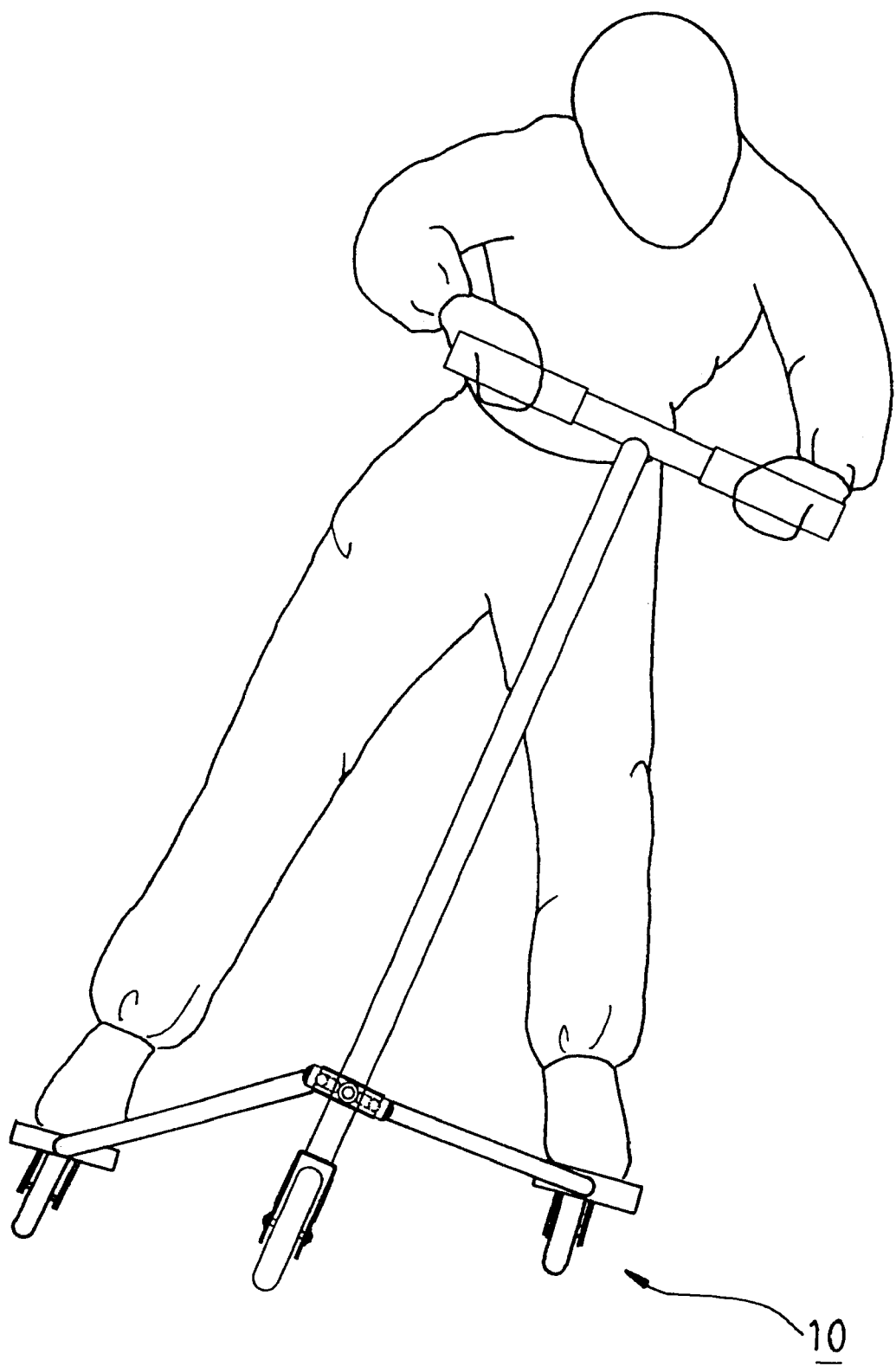
FIG. 9 shows another schematic view of the preferred embodiment of the present invention in operation.

As shown in FIGS. 8 and 9, an operator holds the grip portions 34 of the handlebar frame 30 such that both feet of the operator are placed on the step boards 58 of the two footboards 50. The tricycle 10 is moved forward by turning back and forth the handlebar frame 30 and by changing the center of gravity of the operator's body so as to cause the tricycle to tilt leftward and rightward.

Figure 5:
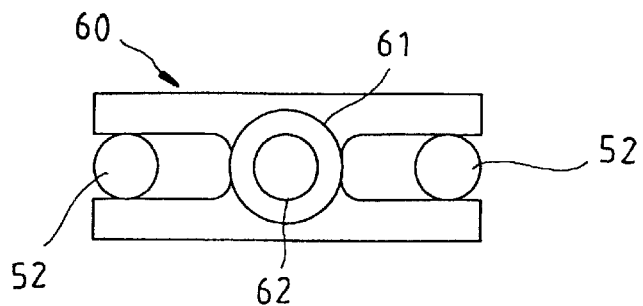
FIG. 5 shows a schematic view of the preferred embodiment of the present invention in a first action state.
Figure 6:
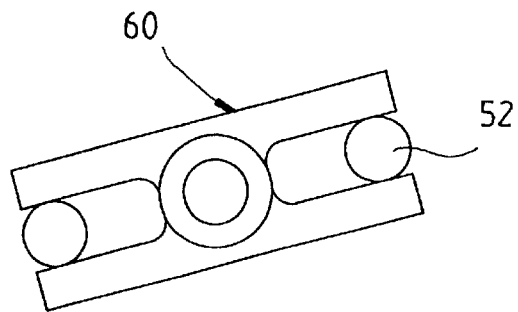
FIG. 6 shows a schematic view of the preferred embodiment of the present invention in a second action state.
Figure 7:
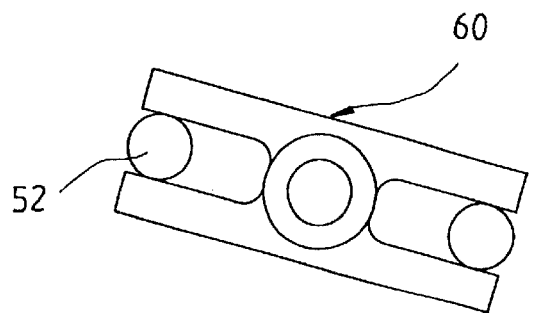
FIG. 7 shows a schematic view of the preferred embodiment of the present invention in a third action state.

As shown in FIGS. 5–7, when the tricycle is tilted leftward and rightward, the two footboards 50 turn on the pivot 54 in relation to the front tube 20. As a result, the swiveling member 60 is actuated by the two bottom tubes 52 to turn on the protruded pillar 24 in a reciprocating manner. In the meantime, the two bottom tubes 52 are refrained from moving in reverse from the initial position, as shown in FIG. 5.

What is claimed is:

1. A tricycle comprising:

a front tube;

a handlebar frame comprising an upright portion, and a grip portion extending from each of two sides of the top end of said upright portion, said upright portion being received in said front tube;

a front fork comprising two side wings extending from two sides of the bottom end of said upright portion, said side wings being provided at a free end with a shaft connection portion;

a front wheel pivoted to said shaft connection portion;

two footboards fastened to two sides of said front tube, each of the two footboards formed of a bottom tube, a step board, and a rear wheel, each said bottom tube being rotatably engaged at a front side to said front tube, said step board being fastened with a rear end of said bottom tube, said rear wheel being fastened to an underside of said step board; and a swiveling member having a body which is rotatably engaged on a rear side of said front tube, said body being provided at a top and a bottom with a cross rod, wherein each said bottom tube is engaged between said two cross rods;

wherein said front tube is provided at a front side with a pivoting seat which is in turn provided at a center thereof with a pivoting hole; wherein said bottom tubes are provided at a front end with a pivoting hole, said bottom tubes being rotatably fastened with said front tube by a pivot which extends through said pivoting hole of said front tube and each said bottom tube.

2. The tricycle as defined in claim 1, wherein said front tube is provided at a rear side with a protruded pillar; wherein said body of said swiveling member is provided with a through hole in which said protruded pillar is received, said protruded pillar being provided at a free end with a threaded hole, wherein said swiveling member is rotatably engaged with said front tube by a bolt which is engaged with said threaded hole of said protruded pillar.

3. The tricycle as defined in claim 1, wherein said front tube is provided with two urging frames whereby said two urging frames are located under said two bottom tubes to confine a pivoting range of said two bottom tubes.

* * * * *